(12) United States Patent
Betti et al.

(10) Patent No.: US 6,476,705 B1
(45) Date of Patent: Nov. 5, 2002

(54) CURRENT DISTRIBUTION DEVICE

(75) Inventors: Bruno Betti, Maiocca di Codogno (IT);
Robert Neuhauser, Bruckberg (DE)

(73) Assignees: Audio Ohm di Tonani Caterina ECS.N.C., Maiocca di Codogno (IT); Lisa Draxlmaier GmbH, Bruckberg (DE)

( * ) Notice: Subject to any disclaimer, the term of this patent is extended or adjusted under 35 U.S.C. 154(b) by 0 days.

(21) Appl. No.: 09/308,692

(22) PCT Filed: Sep. 9, 1997

(86) PCT No.: PCT/EP97/04935

§ 371 (c)(1),
(2), (4) Date: Jul. 30, 1999

(87) PCT Pub. No.: WO98/24107

PCT Pub. Date: Jun. 4, 1998

(30) Foreign Application Priority Data

Nov. 22, 1996 (DE) .................... 296 20 424 U
Apr. 29, 1997 (DE) .................... 297 07 750 U (51) Int. Cl.⁷ .................... H01H 85/08; H01H 85/06
(52) U.S. Cl. .................... 337/161; 337/164; 337/295; 337/290
(58) Field of Search .................... 337/208, 295, 337/255, 264, 290, 161, 164, 189, 229, 293; 29/623

(56) References Cited

U.S. PATENT DOCUMENTS

| | | | |
|---|---|---|---|
| 2,780,696 A | 5/1957 | Lear | |
| 4,131,869 A | * 12/1978 | Schmidt, Jr. et al. | 337/264 |
| 4,150,354 A | * 4/1979 | Namitokov et al. | 337/290 |
| 4,375,629 A | * 3/1983 | Howard | 337/159 |
| 5,155,462 A | * 10/1992 | Morrill, Jr. | 337/3 |
| 5,229,739 A | 7/1993 | Seibang et al. | |
| 5,357,184 A | 10/1994 | McGowan et al. | |
| 5,373,278 A | * 12/1994 | Saulgeot et al. | 337/255 |
| 5,886,611 A | * 3/1999 | Schaller et al. | 337/189 |
| 5,977,859 A | * 11/1999 | Kawamura et al. | 337/295 |

FOREIGN PATENT DOCUMENTS

| | | | |
|---|---|---|---|
| DE | 673990 | 4/1939 | |
| DE | 30 44 040 A | 7/1982 | |
| DE | 38 04 916 A | 10/1988 | |
| DE | 94 11 394 U | 9/1994 | |
| DE | 295 20 691 U | 7/1996 | |
| DE | 296 07 130 U | 7/1996 | |
| JP | 7-254346 A | * 10/1995 | H01H/85/00 |
| JP | 07 254346 A | 10/1995 | |
| JP | 9-282999 A | * 4/1996 | H01H/85/08 |
| JP | 10-199395 A | * 7/1998 | H01H/85/56 |
| WO | WO89/03117 | 4/1989 | |

* cited by examiner

*Primary Examiner*—Anatoly Vortman
(74) *Attorney, Agent, or Firm*—Sughrue Mion, PLLC (57) ABSTRACT

A voltage distribution device for use especially in motor vehicles, includes a first area (2) made of conductive material and fitted with at least one electrical connection (8), at least two separate second areas (3, 4) made of conductive material and fitted with at least one electrical connection each (7), and bridge-like fuse areas (5, 6) made of conductive material, which each link the second areas (3, 4) with the first (2) and are inseparably connected to the first and associated second area. The bridge-like fuse areas (5, 6) each have a cross-section of material calibrated along a longitudinal section according to material thickness and/or depth. In another embodiment of the invention, in a voltage distribution device for use especially in motor vehicles, a first area (2) made of conductive material and with at least one electrical connection (8), and at least two second areas (3B) made of conductive material and with at least one electrical connection each (4), are linked by bridge-like fuse areas made of conductive material (3), whereby these fuses (3) are inseparably connected to the first area (2) by deep-draw sleeves (5).

6 Claims, 6 Drawing Sheets

CURRENT DISTRIBUTION DEVICE

TECHNICAL FIELD

The invention relates to a current distribution device, particularly for motor vehicles.

Current distribution devices are used to distribute or branch electrical currents within a power supply network. To ensure that the current distribution is protected, it is advantageous to provide the current distribution device with fuses.

PRIOR ART

For this purpose, use has so far been made of fuse modules which are available in various standard fuse values and are screwed on to a current distribution component. This solution does, however, suffer from the drawback that a large number of individual parts such as screws, nuts, washers etc. is necessary and that assembly is very complex.

A cable fuse is known from WO 89/03117. This known fuse for cables comprises, in addition to an insulating housing, an integral metal element which connects together, via a fuse area, metal-coated plug-in connections for the purpose of insertion into corresponding cable ends. The subject matter known therefrom relates to a fuse; current distribution is not possible by means thereof and is not envisaged either.

DESCRIPTION OF THE INVENTION

The invention is based upon the technical problem of providing a simple-to-manufacture current distribution device, particularly for motor vehicles, and providing a method of producing such a current distribution device.

In accordance with the invention, this technical problem is solved by a current distribution device comprising the features of claim 1 or a current distribution device comprising the features of claim 6. The technical problem upon which the invention is based is also solved by a production method comprising the features of claim 13 or 14.

A current distribution device according to a first fundamental embodiment of the inventive concept comprises a first area made of electrically conductive material and having at least one electrical connection. Depending on where the current distribution device is placed within a power supply network, the following can e.g. be connected to the connection: current leads, a line to the positive pole of a battery, or a ground lead. If the current distribution device is arranged, for example, on a battery, the battery pole can also be directly connected to the connection. Such a current distribution device also comprises at least two separate areas likewise made of electrically conductive material.

The second areas are each connected to the first area via bridge-like fuse areas made of electrically conductive material. Each bridge-like fuse area is inseparably connected to the first area and to the associated second area. Each bridge-like fuse area also comprises a cross section of material calibrated along a longitudinal section by means of the material thickness and/or width. As regards each fuse area, the particular fuse value desired is defined by different calibrations of the cross sections of material exhibited by the bridge-like fuse areas. The fuse areas can be calibrated both by variation of the bridge length and by variation of the material thickness and/or width or by a combination thereof.

The second areas each comprise at least one electrical connection. Branching current leads can for example be connected thereto. Such branching current leads can be connected for example by means of crimp connectors, by welding, soldering or in any other suitable way.

In accordance with the invention, the inseparable connections of the bridge-like fuse areas to the first area and the respectively associated second area make any additional individual parts such as screws etc. superfluous and as a result the production of the current distribution device is correspondingly simplified. The fuse areas can be advantageously integrated into the current distribution device as a result of the fact that according to the invention, bridge-like fuse areas are provided instead of conventional fuse modules. This means that compact and weight-saving current distribution devices can be obtained.

The first area and the second areas are preferably made from a plate-shaped or band-shaped semifinished article. These areas can, however, also be made from other semifinished goods or produced by other suitable manufacturing techniques.

In an expedient design, the bridge-like fuse areas have the same thickness of material as those sections of the first area and of the associated second area which adjoin the bridge-like fuse area or they have a smaller thickness of material at least along a longitudinal section. In this way, the bridge-like fuse areas can be made from a semifinished article similar to the first and second areas or even from the same semifinished article. The fuse areas can, for example, be calibrated by punching out a specific longitudinal section with a specific width of material and optionally by additionally reducing the material thickness.

It is beneficial for the bridge-like fuse areas to be provided with a curved course at least along the longitudinal sections which exhibit the calibrated cross section of material, thus obtaining in a structurally compact manner that bridge length which is necessary for the desired fuse characteristics. Such a curved course may for example be S-shaped. In an alternative embodiment, a kinked course formed from straight partial sections is also suitable. A straight course of the bridge-like fuse area can also, however, be provided.

In an advantageous embodiment, the first area, the second areas and the bridge-like fuse areas of the current distribution device are integrally designed. This yields an integral current distribution device which is reduced to a single component, thereby dispensing with any complicated assembly work that has so far been necessary when screwing on fuse components. In this version, the current distribution device can be particularly realized as a punched and bent part based on a plate-shaped semifinished product, thereby achieving comparatively convenient production. The semifinished product used may e.g. be a semifinished copper product which can also be surface-treated, a semifinished product made from a suitable alloy or a semifinished product built up as a sandwich composed of different layers of material. An integral construction for the current distribution device can also be achieved by using other semifinished products or by means of other production techniques.

In another favorable embodiment, the bridge-like fuse areas are prefabricated as separate components and then inseparably connected to the first and the respectively associated second area of the current distribution device. In this way, the bridge-like fuse areas can be made e.g. from materials or alloys other than those used in the first area and the second areas of the current distribution device. The bridge-like fuse areas can also be produced and calibrated separately from the first area and the second areas.

In an advantageous embodiment, the bridge-like fuse areas are connected to the materials of the first and of the respectively associated second area by means of plastic deformation, e.g. by squeezing or calking. In other advantageous embodiments, the bridge-like fuse areas are connected to the materials of the first and of the respectively associated second area by means of a welding, soldering or riveting connection. The bridge-like fuse areas are therefore connected to the first and to the second area of the current distribution device in an inseparable fashion, i.e. they cannot be nondestructively separated. A considerable reduction in the number of parts required by the current distribution device is also obtained in these embodiments, because screws, washers etc. are dispensed with. The production of the inseparable connections between the fuse areas and the first and the second areas of the current distribution device can also be automated to good effect.

In an expedient embodiment, the bridge-like fuse area is made from a plate-shaped or band-shaped semifinished product, such as a semifinished copper product which is optionally surface-treated, a semifinished product composed of an alloy or a semifinished product built up as a sandwich.

As is evident from the above comments, the general designation of "inseparably connected", as used in the claims, therefore also covers a one-piece embodiment of the various functional areas of the current distribution device. Of course, it is also possible to provide not only one-piece integral connections of individual areas, but also subsequently produced connections of individual areas (by means of pressing, riveting etc.).

Depending on the installation factors for the current distribution device, this device may be designed to be flat, stepped or to exhibit any other suitable geometry. In the case of a stepped design, the connections may be located at different levels of height. In the case of a flat design, the current distribution device can be essentially designed on the plane of the semifinished product.

In another embodiment, the second areas have a lower thickness of material at their connections in order that comparatively small terminal contact members can also contacted by current leads, e.g. when crimp connectors are used.

A contact base on the first area and a contact base on the associated second area are preferably assigned to each bridge-like fuse area, the two contact bases that belong to a fuse area each being disposed adjacent to the fuse area and facing one another. Should the bridge-like fuse areas blow out, e.g. due to a short circuit or an overload, conventional fuse modules as repair fuses can then be attached to the contact bases which face one another in pairs in order to re-bridge the fused sites after eliminating the cause of fault. Depending on the design, such repair fuses can be screwed on, clamped, resiliently contacted or attached in any other way. The contact bases at the sides of the current distribution device correspondingly comprise bores for screwing on repair fuses, plug-in carriers for inserting repair fuses or similar fastening means.

In an expedient embodiment, the current distribution device is accommodated within a housing made of insulating material. The housing preferably comprises viewing windows in the region of the bridge-like fuse areas so as to allow the fuse areas to be visually checked.

According to a second fundamental embodiment of the inventive idea, a current distribution device according to the invention comprises a first area composed of electrically conductive material and at least one electrical connection. As in the first embodiment of the invention, different current leads, such as a line to the positive pole of a vehicle battery, can be connected to the connection, depending on where the current distribution device is placed within a power supply network. In this case, the current distribution device can also be placed directly on the battery housing so that the battery's positive pole is directly contacted with the electrical connection of the first area.

The current distribution device according to the invention also comprises at least two second areas made of electrically conductive material and which each have at least one electrical connection. Bridge-like fuse areas which are likewise made of electrically conductive materials connect each second area with the first area. The bridge-like fuse areas are inseparably connected to the first area by means of deep-draw sleeves.

Deep-draw sleeves which serve to fasten the fuse areas to the first area of the current distribution device are therefore formed. The deep-draw sleeves can be arranged on that component which forms the first area. Or a deep-draw sleeve can be provided on each component that forms the bridge-like fuse area. In these two embodiments, the deep-draw sleeves are integrally formed on the selected component by a deep-drawing process or an equivalent plastic deformation process, i.e. either at the side of the first area or at the side of the fuse area. The connection between that component which forms the first area and that component which forms the fuse area is then made in each case by plugging the one component (provided with a corresponding through-aperture) on top of the other component with deep-draw sleeve(s) and by subsequent plastic deformation of the deep-draw sleeve's free edge that has been inserted through. A close, inseparable and securely adjacent connection between the first area and the associated fuse area is created by this plastic deformation of the deep-draw sleeve's free edge; such a connection also guarantees reliable current transmission.

It is also conceivable to form deep-draw sleeves at the sides of both components, e.g. as a result of the fact that a fastening section of the component including a fuse area is placed onto the other component which forms the first area, and the two components are pressed together to form deep-draw sleeves which plastically flow into one another.

The deep-draw sleeves are preferably integrally formed onto the first area and corresponding fastening sections of the bridge-like fuse areas are provided with suitable through-apertures which can be fitted onto the deep-draw sleeves. The free edges of the deep-draw sleeves are plastically pressed onto the attached fastening sections of the fuse areas to form an undercut. In this design, the components with the bridge-like fuse areas can be produced more easily, since all the deep-draw sleeves are then formed on the first area of the current distribution device.

In another preferred embodiment, the first area of the current distribution device comprises a carrier area and a holding-up area. The deep-draw sleeves are integrally formed onto the carrier area. The bridge-like fuse areas are provided with fastening sections. Both these fastening sections and the holding-up area each comprise suitable through-apertures that can be fitted onto the deep-draw sleeves. The free edges of the deep-draw sleeves are plastically pressed onto the fastening sections of the fuse areas and onto the holding-up device fitted thereon to form an undercut. In this design, the connection is therefore also reinforced by the holding-up area. The fastening sections of the bridge-like fuse areas are therefore clamped between the carrier area and the holding-up area of the first area. Pressing the deep-draw sleeves formed on the carrier area and projecting through the fastening sections and the holding-up area causes the holding-up area, fastening sections and carrier area to be pressed and fixed.

In the embodiment described above, the holding-up area is preferably connected integrally with the carrier area and folded by plastic deformation onto the deep-draw sleeves of the carrier area and onto the fuse-area fastening sections fitted thereon. The first area can therefore be integrally produced as a punched and bent part, the carrier and holding-up areas being connected for example by means of connecting webs at which the holding-up area is then folded relative to the carrier area. In an alternative embodiment, the carrier area and holding-up area can also be designed as two separate components which are then fitted on top of one another.

In a beneficial embodiment, the second areas are integrally formed with the associated bridge-like fuse areas. The second areas can, for example, be designed exactly like the fastening sections with which the fuse areas are attached to the first area. In this way, those components which each form the fuse area can e.g. be symmetrical in design, e.g. as strip-shaped components having two fastening sections between which the bridge-like reference rupture point of the fuse is located. The current distribution lines, which are each electrically fused by the fuse bridges, can then e.g. be directly contacted at those free fastening sections which face away from the first area.

In an alternative embodiment, the second areas, which serve the terminal contacting of current distribution lines, are inseparably connected to the bridge-like fuse areas. The second areas can be connected to the fuse areas in the same way as or in a manner similar to the connection of the fuse areas to the first area.

In an embodiment, a plurality of bridge-like fuse areas are integrally formed such that the fastening sections of the fuse areas are connected together in the area adjoining the first area. In this way, a plurality of fuse areas can be combined to form a component which is then connected to the first area.

In an advantageous embodiment, one or more terminal contact elements can in addition to the bridge-like fuse areas be inseparably connected, by means of plastically deformed deep-draw sleeves, to the first area. In this way, there may also be non-fused connection options parallel to the current distribution device's connection options fused via the fuse areas. Of course, additional connection options can also be integrally provided on the first area of the current distribution device.

An intimate electrically conducting connection of a first area and fuse areas is obtained by the inventive design of sleeve-like projections which are deep drawn or integrally formed by a similar process, and assembly of the current distribution device is considerably simplified. The screw connections between the first area and the fuse areas are dropped, which means that the associated connecting parts such as screws, nuts, washers etc. are no longer necessary either since the sleeve-like projections are integrally "drawn out of" the material of the associated component. The current distribution device according to the invention can advantageously be produced in an automated production sequence.

In the current distribution device according to the invention, each pressed deep-draw sleeve preferably simultaneously forms a through-aperture. If a bridge-like fuse area is blown, i.e. fuses, during operation, this through-aperture of the associated deep-draw sleeve connection can be directly used to screw on a repair fuse. It is also conceivable, however, for the deep-draw sleeves to keep a closed base.

The fuse areas can be designed in various known ways and are calibrated for the particular current fuse value desired. The type of connection for the outgoing current leads to the second areas can also be designed in various known ways. The current distribution device according to the invention is very variable as regards different equipment versions, as required e.g. in motor cars. A wide variety of bridge-like fuse areas calibrated to different trigger characteristics can be inserted into a basic component that has a number of connecting sites in the form of deep-draw sleeves; these fuse areas are then securely connected by subsequently pressing the deep-draw sleeves.

The current distribution device can also be designed on different spatial planes so as to enable connection options at different spatial height levels. There is also provision for receiving the current distribution device within an insulating housing.

It goes without saying that the deep-draw sleeves explained above can also be used in a current distributor according to the first basic embodiment of the inventive idea in order to connect the fuse areas with the first and/or second areas.

As already explained, different materials including alloys or composite materials, such as copper, zinc or the like, are possible as regards the production of the current distribution device corresponding to the above two embodiments of the inventive concept. The fuse areas and the first and second areas can be made from identical or different materials. In a one-part design version of the current distribution device, the device is preferably made from aluminum or an aluminum alloy, e.g. aluminum with the alloy numbers 1030, 1035, 1040, 1045, 1050 or 1050A. Even in current distribution devices composed of several parts, it is possible to use aluminum materials, for example just for individual fuse areas.

In principle, two methods are advantageous in order to produce a current distribution device whose first and second areas and fuse areas have a one-part design.

The first production process according to claim 13 provides that the raw material band which is for example drawn off from a coil is milled in the region of the fuse areas to be shaped. After milling, the first and second areas as well as the fuse areas are punched out. During the process of punching out, variation of the width simultaneously calibrates the fuse areas, the thickness of which has already been determined.

A very similar production process is obtained in that the desired shaping of the first and second areas and the fuse areas is effected by punching them out. The fuse areas are then pressed into the thickness necessary for calibration. If need be, the fuse areas are then re-punched in order to perform final calibration of the fuse areas by varying the width.

Compared with the former method, this latter method enjoys the advantage that very different fuse values can also be calibrated in the fuse areas. The first method, however, has the advantage that it is possible to check easily the fuse-area thickness predetermined by milling.

Both production processes are beneficial to the extent that it is possible to produce the current distribution device using a band of raw material wound up as a coil, e.g. on a continuous machine with adjacent machining stations.

The choice of material for the one-part current distributor is expediently made with regard to the field of application and in accordance with the production process. A relatively hard aluminum, e.g. exhibiting a hardness in the range of 100–120 HV, is advantageous in the production process in which calibration is effected via a milling operation. If calibration is brought about by means of pressing, a softer aluminum, e.g. exhibiting a hardness in the range of 20–40 HV, is preferred.

Aluminum has proved to be very advantageous, since it was possible to use this material in tests to achieve very favorable courses of the fuse characteristics. Aluminum avoids thermal problems which may arise in materials with a high melting point—as is the case with copper. Aluminum also enjoys the advantage that the current distribution device has a low overall weight, even if even somewhat thinner structural shapes appear possible using other materials like copper. Aluminum also performs very well compared with zinc, a material with an even lower melting point than aluminum, since it is possible to use aluminum to obtain a much thinner structural shape with a much lower weight.

In summary, it can be stated that one-part aluminum current distribution devices according to the invention are beneficial to produce, due to the fact that the material can be worked well and as a result of the fact that the devices can be produced in a continuous process. A weight-saving and compact structural shape is achieved with very good fuse characteristics, whereby different fuse values can be obtained in a current distributor. The terminal contacts can also be arbitrarily designed, e.g. as holes, lugs etc.

Due to aluminum's oxidation properties, it is expedient to provide an aluminum current distribution device with an oxidation-inhibiting coating. Such a coating can assume various forms that are known per se, e.g. in the form of a zinc/copper/tin coating applied in successively connected, electroplating dip baths.

In the aforementioned production processes, it may be an advantage, when there is a plurality of second areas, for these second areas to remain connected together until the end by means of webs which are removed only after all the machining steps have been performed. This makes it possible to machine the current distribution device blanks in a more effective and stable manner.

BRIEF DESCRIPTION OF THE DRAWINGS

To explain the invention further and understand it better, several exemplary embodiments will now be described and explained in more detail with reference to the attached drawings.

DESCRIPTION OF EXEMPLARY EMBODIMENTS OF THE INVENTION

Figure 1:
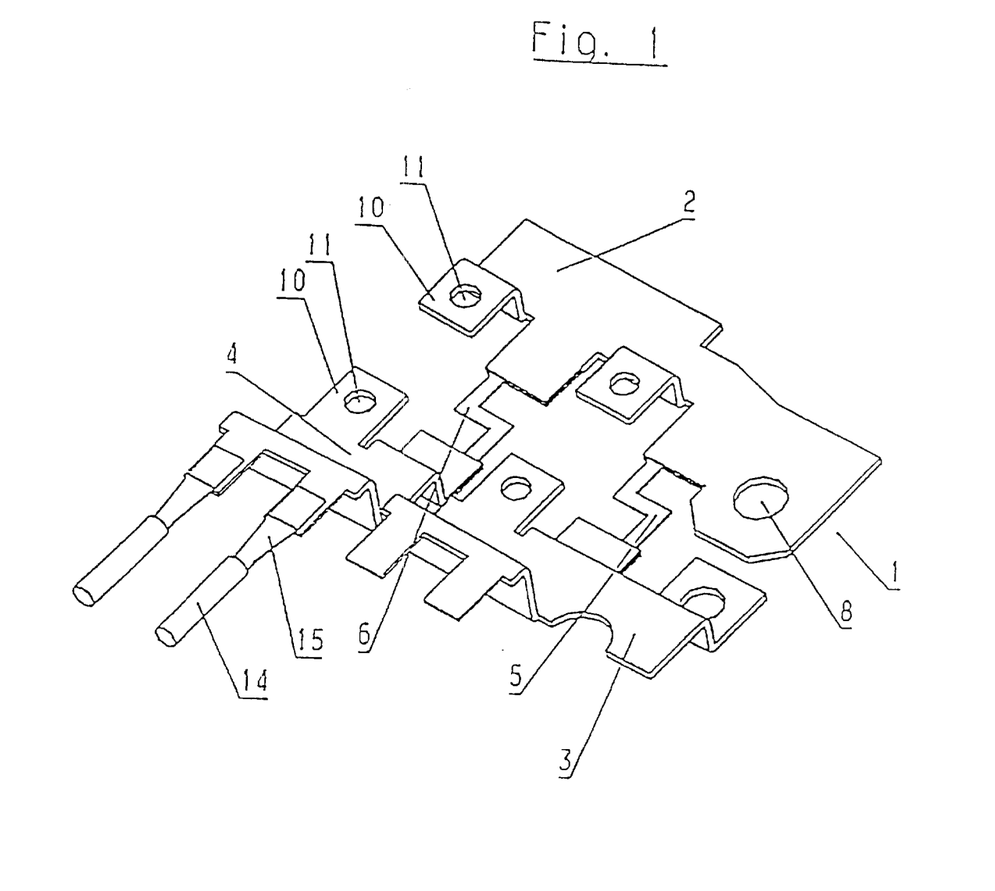
FIG. 1 shows an exemplary embodiment of the current distribution device according to the invention in a perspective view.
Figure 2:
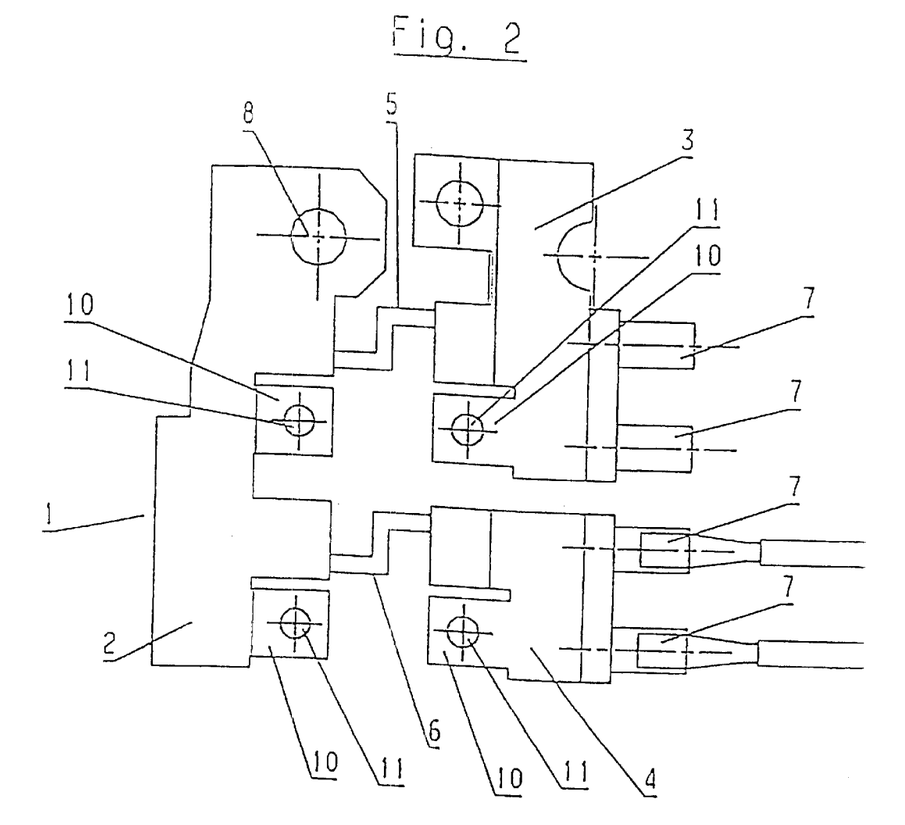
FIG. 2 shows the exemplary embodiment of FIG. 1 as a horizontal projection.
Figure 3:
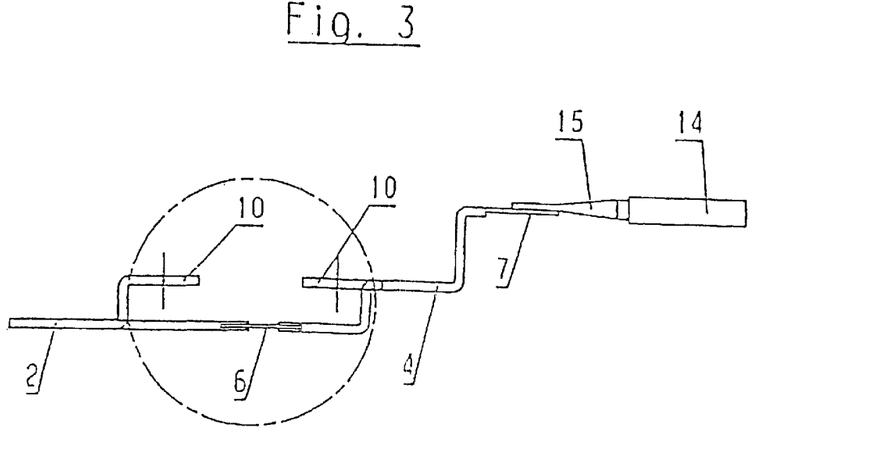
FIG. 3 shows the exemplary embodiment of FIG. 1 in a side view.

As shown in FIGS. 1 to 3, a current distribution device 1 comprises a first area 2 connected in the exemplary embodiment to the positive pole of the battery of a motor vehicle. An aperture 8 in which a corresponding connection pin is fixed is provided in the area 2 in order to connect a current lead that leads to the battery's positive pole. The current distribution device 1 also comprises second areas 3 and 4 which are separate from one another. The areas 3 and 4 each comprise connection lugs 7 to which current leads 14 are connected in the exemplary embodiment; these current leads are responsible for distribution of current to different areas in the power supply network. In the exemplary embodiment, the connection lugs 7 are reduced in terms of their material thickness in comparison to the second areas 3, 4 in order to be able to attach comparatively small contact members 15 of the current leads 14 thereto.

The first area 2 is connected in an electrically conducting manner to the second area 3 via a bridge-like fuse area 5 and is connected in an electrically conducting manner to the second area 4 via another bridge-like fuse area 6. If necessary, further second areas can be provided with associated fuse bridges. Each fuse area 5, 6 is assigned a pair of contact bases 10, one contact base 10 of which is formed on the first area 2 and one contact base 10 of which is formed on the associated second area 3, 4. The contact bases 10 that belong together in pairs face one another and are adjacent to that fuse area 5, 6 with which they are mated. Each contact base 10 is provided with a through-aperture 11 in order to be able to screw a conventional fuse module thereto.

In the exemplary embodiment, current is therefore distributed from the first area 2 via the fuse bridges 5, 6 to the individual second areas 3, 4 and the current leads 14 connected thereto. In this way the power supply lines close to the battery are pre-fused. Additional fuses can be provided in the rest of the power supply network. If, after eliminating a fault, a bridge-like fuse area 5, 6 fuses, i.e. if a fuse 5, 6 is blown, a conventional fuse module as a repair fuse can be screwed on to that pair of contact bases 10 which is assigned to the fused fuse bridge. In this way the connection between the first area and the second area in question is restored and re-fused.

Figure 4:
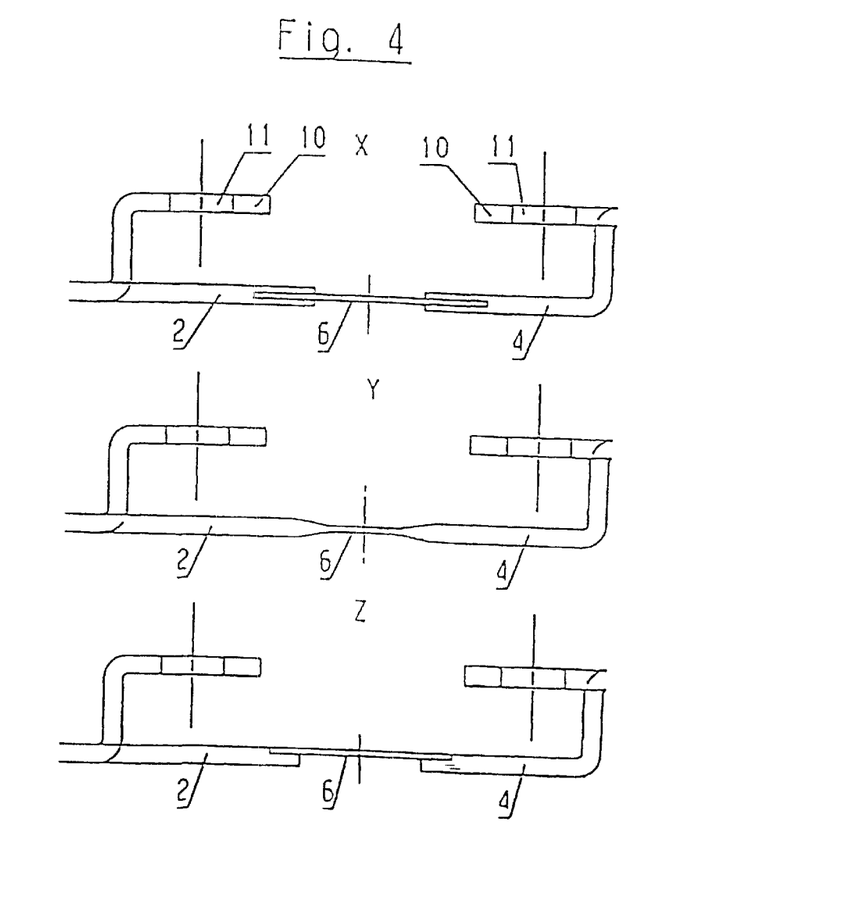
FIG. 4 shows a detail of FIG. 3 in three versions (X/Y/Z)

As can be identified in FIG. 3, the current distribution device 1 is formed on different stepped planes. With regard to the type of connection between the bridge-like fuse areas 5, 6 and the first area 2 and the associated second areas 3, 4, FIG. 4 illustrates different versions as a detail of FIG. 3. A one-piece integral design of the entire current distribution device 1 is depicted in the middle version Y. The current distribution device is made from a single plate-shaped semifinished product as a punched or bent part and the bridge-like fuse areas 5, 6 are correspondingly punched out and made additionally thinner in the exemplary embodiment for the purpose of calibration, e.g. by means of pressing. The upper version X shows fuse areas 5, 6 which have been separately made from a plate-shaped semifinished product and then pressed into the materials of the first and second areas in order to produce the bridge-like electrically conducting connection. The fuse areas have also been similarly pressed on in the lower version Z.

As is evident from FIG. 2, the fuse areas have a curved course in order to accommodate a specific necessary bridge length as compactly as possible in structural terms.

Figure 5:
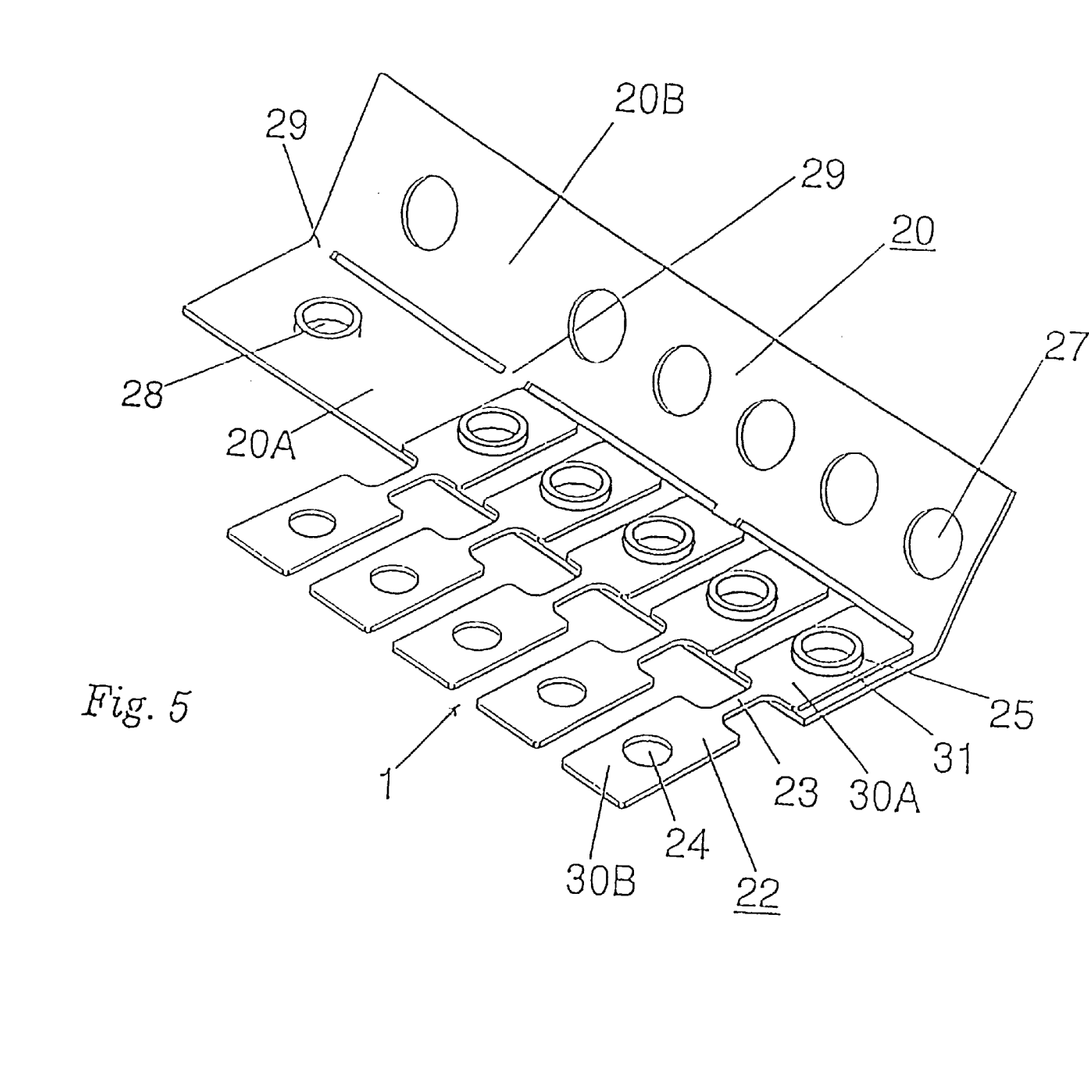
FIG. 5 illustrates in perspective another exemplary embodiment of the current distribution device according to the invention based on a second inventive idea in an intermediate state that arises during production.

In FIG. 5, a current distributor 1 according to the second inventive idea is still found in an intermediate phase during its production.

A basic component 20 of the current distributor is produced from an electrically conducting metallic material as a punched and bent part. It comprises a plate-shaped carrier portion 20A and a plate-shaped holding-up portion 20B congruent thereto; these two portions are integrally connected together via connecting webs 29. A plurality of sleeve projections 25, 28 on the carrier portion 20A are integrally deep-drawn out of the material. These sleeve projections form through-apertures 30 (see FIG. 7). The holding-up portion 20B is provided with through-apertures 27 formed to correspond with the sleeve projections 25, 28 in terms of their layout and diameter.

Strip-shaped elements 22 are also provided with bridge-like fuse portions 23. At their one end, these fuse strips 22 form fastening sections 30A with one through-aperture 31 each, this through-aperture being formed to fit the diameter of the corresponding sleeve projection 25. At their other end, the fuse strips 22 comprise terminal areas 30B each provided with a terminal aperture 24 in the example. The fuse strips 22 are each produced from electrically conducting metallic materials.

Figure 6:
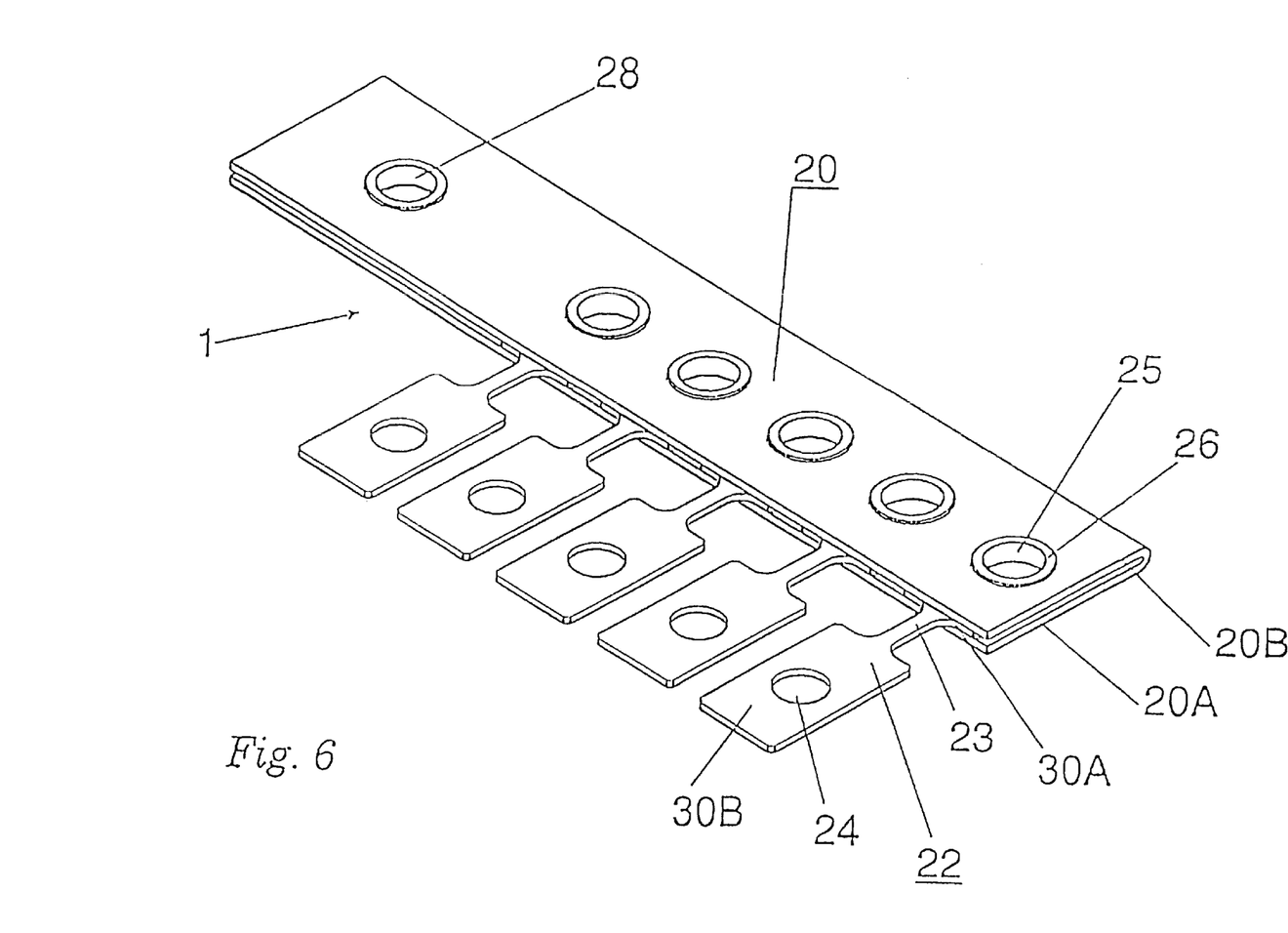
FIG. 6 illustrates in perspective the current distribution device of FIG. 5 in the finished state.

As is apparent from FIG. 5, the fuse strips with the through-aperture 31 of their fastening section 30A are fitted onto the associated sleeve projection 25. The holding-up portion 20B is then folded around the connecting webs 29 onto the carrier portion 20A and onto the fuse strips 22 fitted thereon. FIG. 5 shows a position of the holding-up portion 20B which is already partially folded, while FIGS. 6 and 7 illustrate the final folding position in which carrier portion 20A, fuse strips 22 and holding-up portion 20B lie on top of one another.

The sleeve projections 25, 28 engage through the through-apertures 27 and first protrude somewhat above the holding-up portion 20B. These protruding marginal areas 26 of the sleeve projections 25, 28 are then pressed onto the holding-up portion 20B so that by forming an undercut (cf.

Figure 7:
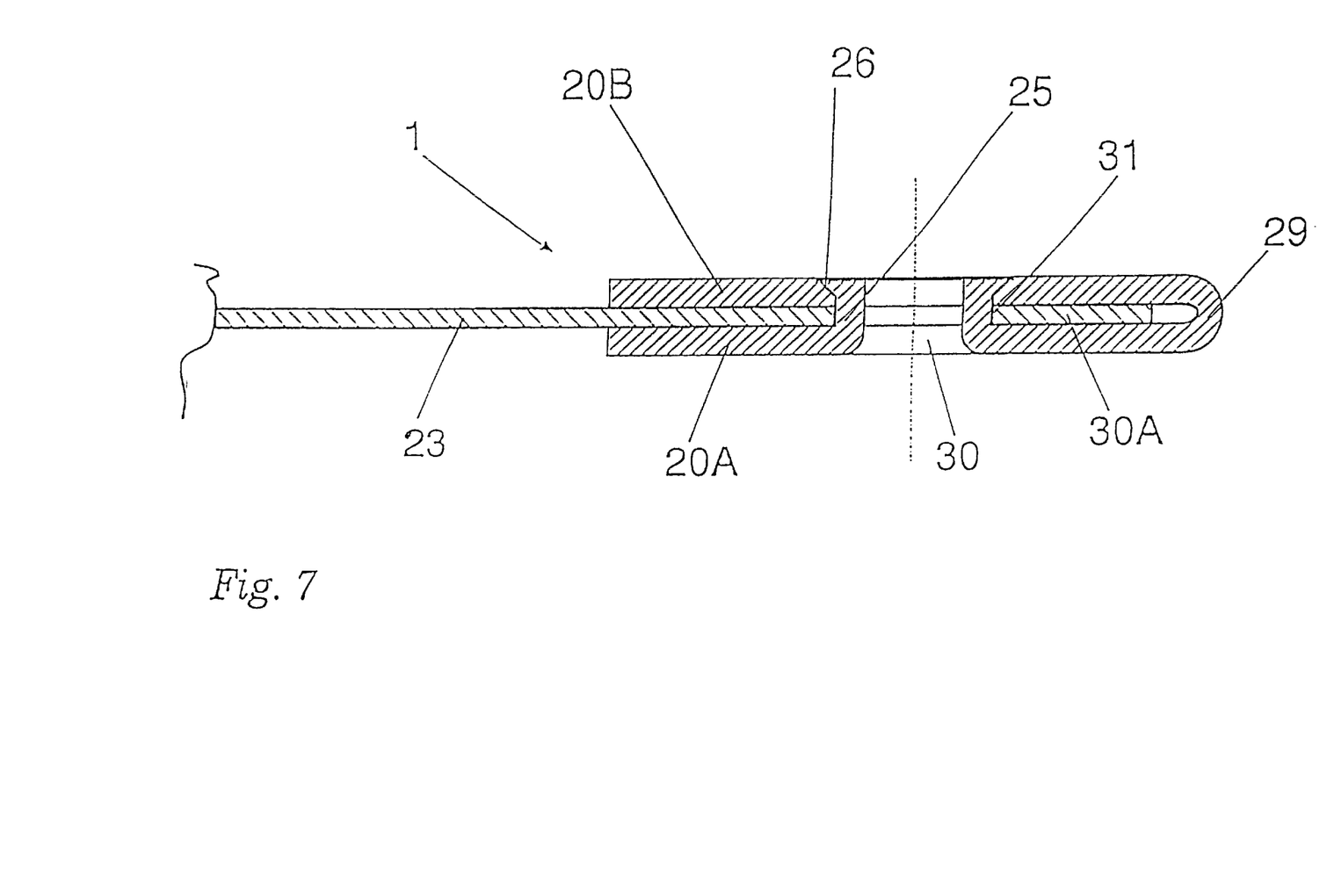
FIG. 7 shows the current distribution device of FIG. 6 as a cross-sectional illustration.

FIG. 7), a reliable and stable connection of the component 20 with the fuse strips 22 is achieved. A smooth continuous surface of holding-up portion 20B and sleeve edge 26 can be obtained by means of pressing.

The illustrated current distributor is connected, via the terminal aperture 28, to a connection pin of a positive pole of a vehicle battery. Current leads which lead further are connected, e.g. by means of suitable connection pins, to the terminal apertures 24 of the fuse strips 22. In this way, the area 20 is therefore electrically branched into a plurality of sub-areas 30B by interposing the fuse portions 23. Of course a combination of different fuse strips 22 exhibiting different fuse characteristics and a different material composition can be used in the current distributor 1.

What is claimed is:

1. A current distribution device, particularly for motor vehicles, comprising a first area (20) made of electrically conducting material, said area having at least one electrical connection (28), at least two separate second areas (30B) made of electrically conducting material, said second areas each having at least one electrical connection (24), and bridge-like fuse areas (23) made of electrically conducting material, said fuse areas each connecting said second areas (30B) to said first area (20), wherein said bridge-like fuse areas (23) are inseparably connected to said first area (20) by means of deep-draw sleeves (25), said first area (2; 20), said second areas (3, 4; 30B) and said fuse areas (5, 6; 23) of said current distribution device (1) are made of aluminum or an aluminum alloy.

2. A current distribution device according to claim 1, wherein said deep-draw sleeves (25) are integrally formed onto said first area (20) and said bridge-like fuse areas (23) are provided with fastening sections (30A) having suitable through-apertures (31) which can be fitted onto said deep-draw sleeves (25), the free edges (26) of said deep-draw sleeves (25) being plastically pressed onto said attached fastening sections (30A) to form an undercut.

3. A current distribution device according to claim 1, wherein said first area (20) comprises a carrier area (20A) and a holding-up area (20B), said deep-draw sleeves (25) are integrally formed onto said carrier area (20A), said bridge-like fuse areas (23) are provided with fastening sections (30A), said holding-up area (20B) and said fastening sections (30A) each have suitable through-apertures (27, 31) which can be fitted onto said deep-draw sleeves (25) and said free edges (26) of said deep-draw sleeves (25) are plastically pressed onto said attached fastening sections (30A) and onto said holding-up area (20B) fitted thereon to form an undercut.

4. A current distribution device according to claim 3, wherein said holding-up area (20B) is integrally (29) connected to said carrier area (20A) and is folded, by plastic deformation, onto said deep-draw sleeves (25) of said carrier area (20A) with said fastening sections (30A) fitted thereon.

5. A current distribution device according to claim 1, wherein said second areas (30B) are integrally formed with said bridge-like fuse areas (23).

6. A current distribution device according to claim 1, wherein at least said fuse areas are provided with an oxidation-inhibiting coating.

* * * * *